United States Patent

[11] 3,626,185

[72] Inventors William Parrish
 Stamford, Conn.;
 Imre E. Vajda, Yonkers, N.Y.
[21] Appl. No. 766,585
[22] Filed Oct. 10, 1968
[45] Patented Dec. 7, 1971
[73] Assignee U.S. Philips Corporation
 New York, N.Y.

[54] X-RAY POWDER CAMERA HAVING A SEMICYLINDRICAL FILM HOLDER AND MEANS TO SIMULTANEOUSLY ROTATE A SPECIMEN ABOUT TWO MUTUALLY PERPENDICULAR AXES
 5 Claims, 3 Drawing Figs.

[52] U.S. Cl..................................................... 250/51.5,
 250/65
[51] Int. Cl....................................................... G01n 23/20
[50] Field of Search........................................... 250/51.5,
 65

[56] References Cited
UNITED STATES PATENTS
| | | | |
|---|---|---|---|
| 2,926,258 | 2/1960 | Weissmann .................. | 250/65 |
| 3,160,748 | 12/1964 | Chan ........................... | 250/51.5 |
| 3,230,367 | 1/1966 | Chan ........................... | 250/51.5 |
| 3,384,748 | 5/1968 | Rioux et al.................... | 250/51.5 |

OTHER REFERENCES
" Micro X-Ray Diffraction Camera for Studies of Orientation Textures and Single Microcrystals," J. Glas, Journal of Scientific Instruments, Vol. 39, 1962.

Primary Examiner—James W. Lawrence
Assistant Examiner—C. E. Church
Attorney—Frank R. Trifari ABSTRACT: A camera for X-ray diffraction studies of small single crystal or polycrystalline specimens is disclosed. The camera provides a means of accurately centering the specimen, a collimator and a semicylindrical film mount. The specimen is simultaneously rotated around its mounting axis and pivoted around the camera axis to provide an X-ray powder photograph.

INVENTOR.
WILLIAM PARRISH
IMRE E. VAJDA

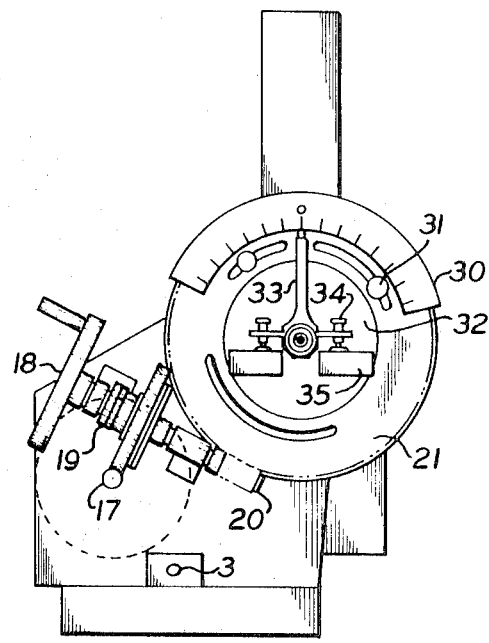
Fig. III
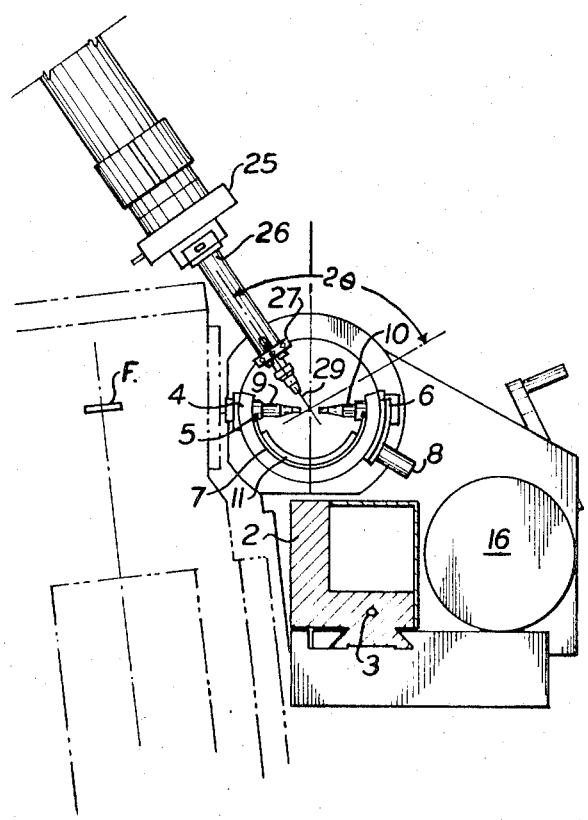
Fig. II
INVENTOR.
WILLIAM PARRISH
IMRE E. VAJDA
BY
AGENT

X-RAY POWDER CAMERA HAVING A SEMICYLINDRICAL FILM HOLDER AND MEANS TO SIMULTANEOUSLY ROTATE A SPECIMEN ABOUT TWO MUTUALLY PERPENDICULAR AXES

The invention described herein was made in the performance of work under a NASA contract and is subject to the provisions of section 305 of the National Aeronautics and Space Act of 1968. Public Law 85-568 (72 Stat. 435; 42 U.S.C. 2457).

The invention relates to a camera for obtaining powder-type photographs of single crystals or polycrystalline powder specimens. More particularly, the invention relates to an X-ray powder camera in which a film is bent into a semicircle; a collimated X-ray beam strikes the specimen which is simultaneously rotated around two axes and the diffracted X-rays fall upon the film as a series of concentric rings.

The camera, according to the invention, is a modification of and an improvement over the Debye-Scherrer type of camera in which the specimen is mounted for rotation at the center of a circular cassette in which the film is wrapped around the inner wall. A collimated X-ray beam passes through a hole in the film, strikes the specimen, which may be continuously rotated and the diffracted X-rays fall upon the film as a series of concentric rings. Because the specimen only rotates about the axis of the cassette, such a camera can only serve to record diffraction patterns of polycrystalline powder specimens since it requires a random distribution of the powder grains to insure that there be enough particles oriented at the correct angles to the incident beam to allow reflections of characteristic X-rays from all possible reflecting planes.

It is a principal object of this invention to provide an improved camera for obtaining X-ray powder diffraction photographs of a single crystal as well as a polycrystalline powder sample.

It is a further object of this invention to provide an improved camera for obtaining X-ray diffraction photographs of a powder specimen having improved resolution and greater intensity.

These and further objects of the invention will appear as the specification progresses.

Briefly, the camera according to the invention employs a semicircular cassette around the inner wall of which the film is arranged in a light-tight envelope.

The specimen is mounted on a support which permits accurate centering at the intersection of the collimated X-ray beam and the center of the camera. During exposure to the X-ray beam the specimen is continuously rotated around its support axis and simultaneously the support axis is pivoted around the center of the camera in the plane intersecting the rotation axis, the incident and the center of the camera. The continuous rotation speed should be faster than the pivoting or scanning speed to bring the specimen into a maximum number of different positions from a single crystal, and a powder pattern can be obtained from a single crystal, and a powder specimen will have a greater number of reflections recorded thereby increasing the recorded intensity and accuracy. For example, we have used a 20 r.p.m. continuous rotation and 5°/min scanning speed. The scanning range may be selected and in the present design the maximum scanning angle is 95° which is sufficient for all types of specimens.

The size of the incident beam is limited by a collimator and the undiffracted portion of the beam passes through an exit port. The collimator and exit port were designed in accordance with well-established principles (Parrish and Cisney, U.S. Pat. No. 2,514,791, X-ray Collimating System, July 11, 1950).

The camera according to the invention obtains X-ray diffraction powder photographs from very small single crystals or aggregates of powder specimens. If the specimen is a single crystal the conventional single crystal camera or counter-tube diffractometer techniques can be used. If the specimen contains more than one crystal, the single crystal technique become difficult or impossible to use because of the overlapping patterns. Since even very small specimens may contain a number of crystals, but in insufficient number to produce a good pattern with a Debye-Scherrer camera, a camera which can produce a reasonably good powder pattern of small samples for identification purposes is a desirable objective.

A powder pattern is normally obtained using a large number of randomly oriented crystallites so that all possible orientation are equally likely to occur. To obtain a "powder" pattern from a single crystal requires the crystal to be brought into all possible positions required to produce all the reflections in their correct relative intensities. Thus, the crystal should be rotated around three mutually perpendicular axes to develop all the possible orientations. The camera, according to the invention has only two rotation axes, and this limitation was accepted because of the very close mechanical tolerances that were required in working with small samples.

To introduce the third motion would have required the arm to tilt a small angular increment out of the pivot plane at the end of each scan, and to continue the scans until these increments reached 90°. This would have made the camera considerably more complicated and would have made it very difficult to maintain the very small mechanical tolerances required to keep the small specimen accurately centered in the X-ray beam. If the specimen consists of even a few randomly oriented crystallites the need for the third motion decreases.

The principle of the camera according to the invention is thus similar to a Debye-Scherrer cylindrical powder camera except for the additional scanning motion.

The invention will be described with reference to the accompanying drawing which shows a camera constructed in accordance with the invention and in which, FIG. 1 is a plan view of the camera;

FIG. 2 is a section taken along the lines II—II in FIG. 1; and

FIG. 3 is a view of the mechanism for oscillating the specimen.

Figure 1:
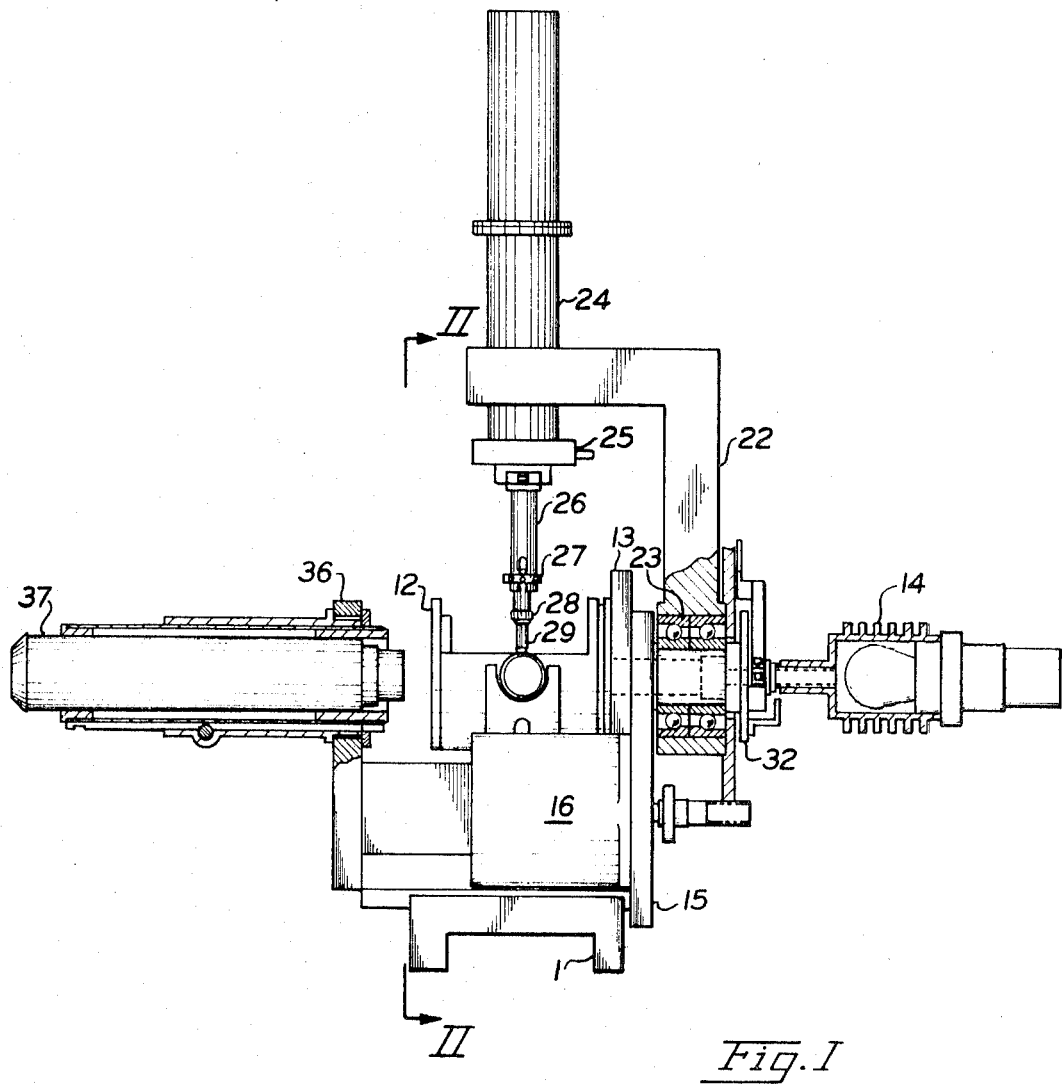

The camera is shown mounted on a guide 1 which in turn is fastened on a camera track (not shown). This track has a screw adjustment to allow aligning the camera with the X-ray tube. The camera slide 2 is fitted onto this track and is horizontally moveable with an adjusting screw 3 which also serves for alignment of the camera with the X-ray tube. This alignment is facilitated by mounting a counter tube on the track behind the camera and adjusting the track and camera to obtain the highest intensity. The film holder 4 is a cylindrically shaped surface which holds the light-tight film envelope 7. When analyzing small specimens a 20 mm. radius is a satisfactory compromise between resolution and intensity although other radii may be used. The upper portion of the cylinder wall is cut away to allow the specimen holder 29 at least 90° 2θ scanning movement normal to the center line of the cylinder. The film holder has four pins 5 with notches, two of which are stationary and two are mounted onto a sliding curved segment 6 with an inner diameter the same as the outer diameter of the cylinder. The cylinder has two elongated holes which allow the pins to pass through. The envelope 7 is so constructed that when it is placed in the cylinder and clamped between the four notched pins it takes the shape of the inner diameter of the cylinder and then the curved segment is clamped to the cylinder with a knurled head screw 8. The incident beam collimator 9 and exit port 10 are precisely aligned with the center line of the film holder. The tips of 9 and 10 are shaped to allow a maximum diffraction angle of front and back reflections. The front end of the collimator 9 has a ray proof fitting with the X-ray tube tower. At the end of the film holder the film is sandwiched between this and a cylindrical metal mask 11 which blocks out radiation from the film of exactly known circumference length. This shadow is used as a scale to measure the change of film length during processing. In front of the film holder is a plug 12 which serves as radiation protection, and is removed when centering the crystal.

The film holder is mounted with three clamps onto a flanged shaft 13 and is marked to show the angle of view of the X-ray tube target. The shaft is hollow in case illumination 14 is required from the back to align the specimen. The shaft 13 in turn is mounted onto a vertical plate 15 and attached to the horizontal slide 2. For scanning a motor 16 is mounted onto vertical plate 15 with a worm gear reduction 17 to a drive shaft and handle 18 and also a slip clutch 19 for manual drive. On the end of this shaft another worm 20 engages a worm gear 21 fastened to an "L" shaped motor bracket 22. The motor bracket rotates on a pair of preloaded ball bearings 23 on the flanged shaft 13. On the far end of the bracket a reduction gear motor with shaft extension 24 is clamped. It is desirable to accurately center the specimen so that it remains in the center of the camera in the collimated X-ray beam during rotation and scanning over the entire angular range. This is accomplished by accurately machining the collimator mount in the camera, and by providing adjustments of the specimen position in three orthogonal directions.

On the shaft extension, an X-Y cross slide 25 is mounted. The cross slide has an extension 26 with a hole in the center. The end of the outside is threaded and has two elongated slots 180° from each other. Inside of the extension is a compression spring and on the end of the hole a receptacle 28 is fitted with a guide pin which fits the slots of the extension. The guide pin rests on a nut 27 which elevates or lowers the receptacle 28 and provides the Z motion in order to align the mounted specimen in the center of the rotations and the X-ray beam. The crystal or crystals are glued to a fiber such as glass, which in turn is glued to a nipple 29. The nipple is fastened to the receptacle. In order to align the mounted specimen a microscope 37 with a cross-hair marker is mounted on a plate 36 fastened on the front end of horizontal slide 2. In centering, the specimen is aligned while rotating on its own axis. Then it is pivoted in the plane which intersects the axis of rotation. The crosshair marker of the microscope assists the alignment of the specimen, which has to remain centered at one point while rotating and scanning.

The worm gear 21 has a segment of a dial 30 and two adjustment stop buttons 31. A flange 32 is attached to the stationary shaft 13 and has an extension on which a dial indicator 33 is placed. This dial indicator has tow adjustment screws 34 which alternately engage and disengage a micro switch 35 at one end of the scanning period and the other. This makes the bracket 22 oscillate between the two stop buttons 30.

What is claimed is:

1. A camera for obtaining X-ray diffraction photographs of powder specimens comprising a semicylindrical member with means to mount film responsive to X-radiation around the inner wall thereof, means to introduce a collimated beam of X-radiation into said member at right angles to the longitudinal axis thereof, means to support a specimen with its center at the intersection of said beam and said longitudinal axis, and means to simultaneously pivot said specimen about said longitudinal axis and to rotate said specimen about a second axis which is perpendicular to said longitudinal axis whereby different sets of reflecting planes of the specimen intercept the X-radiation and reflect the same upon said film so as to form an image of concentric rings.

2. A camera as claimed in claim 1 in which the specimen is mounted on a fine fiber which is supported by a shaft which rotates about said second axis.

3. A camera as claimed in claim 2 in which the specimen pivots through an angle of more than 90°.

4. A camera as claimed in claim 3 in which the specimen support means is rotated by a motor through a worm-gear assembly.

5. A camera as claimed in claim 4 in which the specimen is supported by a shaft mounted on cross-slides for centering the specimen on three mutually perpendicular axes.

* * * * *